Patented Aug. 10, 1943

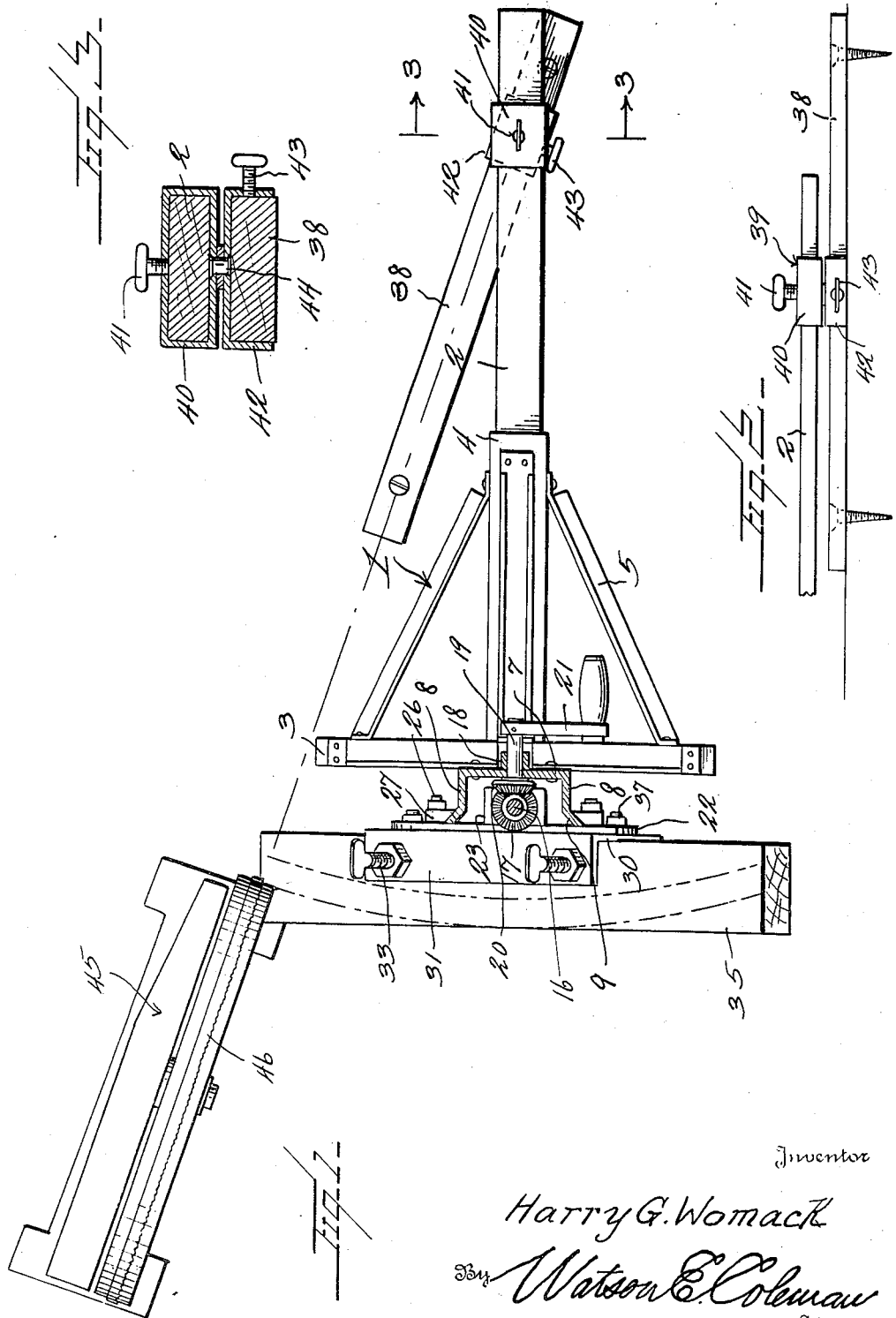

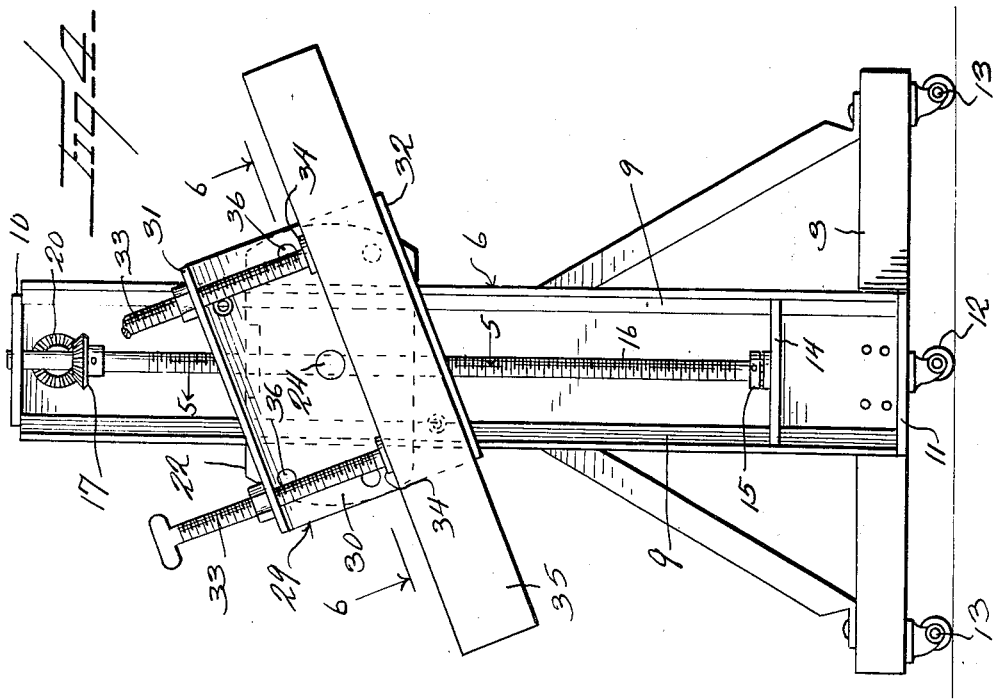

2,326,509

UNITED STATES PATENT OFFICE 2,326,509

SUPPORTING CARRIAGE FOR WOOD TO BE SAWED

Harry G. Womack, Atlanta, Ga.

Application July 5, 1941, Serial No. 401,277

3 Claims. (Cl. 143—171)

This invention relates generally to the class of wood sawing, and pertains particularly to improvements in machines for curve cutting or sawing of wood.

The primary object of the present invention is to provide an improved mechanism whereby a length of wood may be held in a prescribed position and moved with respect to a band saw to be cut along a curved line, and also to give a wreath or twist to the cut, the present device being particularly designed to facilitate the cutting of hand rails or stringers for stairways.

Another object of the invention is to provide a carriage for sawing hand rails from wood stock, wherein the stock may be held at any desired angle with respect to the horizontal and may be swung through a curved path with respect to a band saw to facilitate the cutting of a long piece of material longitudinally and along a twisted or spiral line and to give, at the same time, a longitudinally arcuate curvature to the cut.

Still another object of the invention is to provide a device for supporting a relatively long piece of wood at an angle to the horizontal and for facilitating the swinging of the piece around a fixed point with respect to a cutting band saw, with means to facilitate moving the piece of wood vertically while the same is being sawed so that the piece may be passed between the upper and lower guides of the band saw machine.

The invention will be best understood from a consideration of the following detailed description taken in connection with the accompanying drawings, it being understood, however, that the invention is not to be considered as limited by the specific illustration or description but that such illustration and description constitutes a preferred embodiment of the invention.

In the drawings:

Figure 1 is a view in top plan of the device embodying the present invention and showing a piece of wood secured therein and a band saw at one end of the wood;

Figure 2 is a view in side elevation of the radius point forming means which is connected with the tail piece of the carriage frame;

Figure 3 is a sectional view on the line 3—3 of Figure 1;

Figure 4 is a view in front elevation of the machine shown in Figure 1;

Figure 5 is a vertical section taken on the line 5—5 of Figure 4;

Figure 6 is a section taken on the line 6—6 of Figure 4;

Figure 7 is a view in elevation of the circle plate.

Referring now more particularly to the drawings the machine or wood carriage will be seen to comprise a horizontal skeleton frame indicated generally by the numeral 1. This frame consists of a relatively long beam 2 which provides a rearwardly extending tail piece, as hereinafter described, and at its forward end this beam 2 is secured to a cross head beam 3.

For the purpose of strengthening the structure the forward end of the beam 2 is extended through a sleeve 4 which is also secured at its forward end to the cross head beam 3. This latter beam may be of any desired form but is preferably of channel iron arranged with the open or channel side directed rearwardly.

Connected with each end of the cross head beam 3 and extending rearwardly and inwardly is a brace beam 5 which is secured at its rear end to the sleeve 4.

At its transverse center the cross head 3 has secured thereto one end of the standard 6 which, as is clearly shown in Figures 4, 5 and 6, is of channel formation and has the back or web portion 7 placed against the front side of the cross head 3 and riveted or otherwise suitably secured thereto. The channel standard 6 has the longitudinal side flanges 8 each of which has a portion along its free longitudinal edge outwardly or laterally turned to extend forwardly and obliquely with respect to the plane of the flange to provide a longitudinal guide lip 9. As shown in Figure 6 these guide lips are divergently related or directed.

At the upper end of the standard 6 there is fixed the head plate 10 and the lower end of the standard has secured thereto a foot plate 11. To the under side of the foot plate 11 is secured a caster wheel 12 and a similar caster wheel 13 is secured to each outer end of the cross head 3, as shown in Figure 4.

Secured across between the flanges 8 of the standard at a suitable distance above the foot plate 11 is a horizontal bearing plate 14 upon the top of which is mounted a step bearing 15. Supported upon this step bearing is the lower end of a vertical worm shaft 16, the upper end of which shaft extends through and has bearing in the head plate 10, as shown in Figure 4. Adjacent the upper end of this shaft there is secured the miter gear 17 and at an elevation slightly above this miter gear the web 7 of the standard carries a bearing 18, Figure 1, through which extends a crank shaft 19 which supports upon its front end the miter gear 20 which is in toothed connection with the gear 17. Upon the rear end of this shaft 19 is secured a crank 21 by means of which the shaft may be turned.

Disposed across the front of the standard 6 and having sliding contact with the edges of the guide lips 9 is a circle plate 22 which carries the rearwardly directed tongue 23 which is provided with a threaded opening for the reception of the worm shaft 16. This circle plate has at its exact center a pivot pin 24 and at opposite sides of the pivot pin and concentric therewith are arcuate guide slots 25.

To the back of the circle plate 22 there are secured by bolts 26, as shown in Figure 6, the spaced parallel cleats 27 which have their opposed edges undercut so as to provide dovetail guides 28 in which are slidably engaged the guide lips 9.

Disposed against the face of the circle plate 22 is a clamp plate 29 which is preferably of channel form, as shown. This clamp plate is maintained in position by the pivot pin 24 so that it may have rotation on the pin against the face of the circle plate. The clamp plate, as shown, has a back or web portion through which the pivot pin 24 passes, this portion being indicated by the numeral 30, and the opposite longitudinal edge flanges 31 and 32. The flange 31 is provided with suitable threaded openings, not detailed, through which extend clamping screws 33. These screws are directed across the open front of the clamp plate and have upon their lower ends the swivel feet 34 which cooperate with the flange 32, which constitutes a clamping jaw, for maintaining in working position a piece of material which is to be sawed, such a piece being here shown and indicated by the numeral 35.

The clamp plate 29 carries upon each side of the pivot pin 24, by which it is attached to the circle plate 22, two or any suitable number of guide pins 36 which slidably engage in the adjacent arcuate guide slot 25 of the circle plate. These pins are screw-threaded and carry securing nuts 37, as shown in Figure 6, which when tightened up against the rear side of the circle plate 22, function to secure the clamp plate in the desired position to which it may have been rotated. Thus, it will be seen, particularly upon reference to Figure 4, that when a long piece of wood which is to be sawed is secured to the clamp plate such a piece may be maintained horizontally or at an angle while the sawing operation is being carried out, as is hereinafter described.

Cooperating with the tail piece 2 is a radius bar which is indicated by the numeral 38. This bar is secured in a suitable manner to the supporting surface upon which the carriage structure is located, and it is joined by a radius pivot unit, indicated generally by the numeral 39, to the tail piece.

The unit 39 comprises a collar 40 which encircles the tail piece 2 and carries a clamp screw 41 adapted to engage the tail piece and hold the collar against movement longitudinally thereon. Cooperating with the collar 40 is a yoke 42 which engages over the top of the radius bar 38 and is clamped thereto by the screw 43. Coupling the collar 40 and the yoke 42 together is a pivot pin 44 which is upon the longitudinal centers of the tail piece 2 and bar 38. Thus it will be seen that by loosening the screw 41 the tail piece 2 can be shifted through the collar so that the radius of the arc through which the piece of work 35 is to be moved can be increased or decreased as may be desired.

The numeral 45 generally designates a band saw machine. Such machines are of well known construction or design, therefore no detailed construction of the same is here illustrated, there being shown only a sufficient amount of the structure to make possible an intelligent description of the operation of the invention. This band saw is located at a proper position with respect to the pivot 44 so that the piece of wood 35 when moved through an arc having the pivot 44 as its radius point, will be properly presented to the toothed edge of the band saw 46 to be cut.

The center line of the bar 38 is in line with the toothed edge of the band saw as shown in Fig. 1. The change of radius of the cut to be made, is made by moving the radius point 44.

In making the first of the cuts indicated by broken lines on the piece 35 the first cut is made by loosening the thumb screws 41 and 43 and the radius point, and consequently the carriage is shifted to the desired radius, the thumb screw 43 taking care of the adjustment of radius in relation with the band saw and the thumb screw 41 is used in making adjustment for the width of the piece of wood to be sawed.

For example, in making the first or outside cut, both thumb screws will be used to set the radius point at the proper place on bar 38 and the tail piece 2. After the first cut is made the thumb screw 43 is loosened and the entire carriage is moved toward the band saw the same distance as the width of the hand rail or finished piece of wood. In making this adjustment the thumb screw 41 is not touched.

As the work is being cut the crank 21 is turned as may be necessary to raise or lower the work, depending on whether the front end thereof is higher or lower than the other end. This is done to allow the piece of work to pass between the top and bottom guides of the band saw.

The cut which will thus be made in the piece of wood, because of the fact that the wood is being sawed while held at an angle, will give the wood a wreath or twist on two sides. The top and bottom cuts are then easily made in another operation, in the usual manner.

I claim:

1. A work support of the character stated comprising a carriage structure, a horizontal tail piece integral with the carriage structure, a vertical standard connected with the carriage structure at one end of the tail piece, means slidably mounted on the tail piece adjacent the other end for securing the tail piece for swinging around a vertical axis, a plate having sliding connection with said standard for movement longitudinally thereon, means carried by the standard and connected with the plate by which the movement of the plate on the standard may be effected, and a clamp supported on said plate for oscillation about a horizontal axis, the clamp being disposed upon the side of the standard opposite from the tail piece pivot.

2. A structure of the character stated comprising a frame, a beam extending horizontally from one side of the frame and constituting a tail piece, a pivot unit connected with the tail piece and including a collar slidable on the tail piece, means for securing the collar to the tail piece, a fixed bar, a pivot between the fixed bar and the sliding means, a standard secured to the frame at the other end of said tail piece, a work securing clamp mounted upon the standard to move lengthwise thereof, said clamp being pivoted for oscillation around a horizontal axis, and means carried by the standard and connected with the clamp for effecting the vertical movement of the clamp on the standard.

3. Mechanism for supporting a piece of work for movement relative to a band saw, comprising a horizontal frame, a tail piece extending horizontally from the frame, a pivot adjustable longitudinally of the tail piece, means for securing the pivot in a fixed position, a standard supported by the frame at an end of the tail piece remote from the pivot, a worm shaft carried by the standard and extending longitudinally thereof, means at opposite sides of the standard forming longitudinal guide lips, a plate, means carried by the plate for engaging said guide lips to connect the plate with and for sliding movement lengthwise of the standard, a connection between the plate and said worm, means for turning the worm to effect movement of the plate on the standard, a work clamp, and means coupling the work clamp with said plate for turning the clamp on a horizontal axis.

HARRY G. WOMACK.